United States Patent
Yokota

(10) Patent No.: US 11,791,897 B2
(45) Date of Patent: Oct. 17, 2023

(54) RECORDING APPARATUS

(71) Applicant: SEIKO EPSON CORPORATION, Tokyo (JP)

(72) Inventor: So Yokota, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 17/182,712

(22) Filed: Feb. 23, 2021

(65) Prior Publication Data

US 2021/0266067 A1    Aug. 26, 2021

(30) Foreign Application Priority Data

Feb. 26, 2020   (JP) ................................ 2020-030183

(51) Int. Cl.
| | |
|---|---|
| *H04B 10/00* | (2013.01) |
| *H04B 10/116* | (2013.01) |
| *G02B 5/20* | (2006.01) |
| *B41J 2/21* | (2006.01) |
| *B41J 2/135* | (2006.01) |

(52) U.S. Cl.
CPC ............ *H04B 10/116* (2013.01); *B41J 2/135* (2013.01); *B41J 2/21* (2013.01); *G02B 5/20* (2013.01)

(58) Field of Classification Search
CPC . H04B 10/116; H04B 10/112; H04B 10/1123; H04B 10/114; H04B 10/1143; H04B 10/1149; H04B 10/40; H04B 10/2507; B41J 2/135; B41J 2/21; B41J 2/215; B41J 2/2135; B41J 2/04508; B41J 2/04505; G02B 5/20
USPC ....... 398/172, 118, 119, 127, 128, 129, 130, 398/131, 135, 136, 158, 159, 33, 38, 201; 347/19, 14, 15, 9, 102, 86, 84
See application file for complete search history.

(56) References Cited

U.S. PATENT DOCUMENTS

| | | | |
|---|---|---|---|
| 7,992,953 B2 * | 8/2011 | Yorimoto | B41J 29/393 |
| | | | 347/14 |
| 2008/0231649 A1 * | 9/2008 | Kawabata | B41J 2/17509 |
| | | | 347/14 |
| 2010/0224895 A1 | 9/2010 | Murazaki et al. | |

FOREIGN PATENT DOCUMENTS

| | | |
|---|---|---|
| JP | H05-036380 A | 2/1993 |
| JP | H11-273625 A | 10/1999 |
| JP | 2015-178202 A | 10/2015 |
| WO | 2009/028656 | 3/2009 |

* cited by examiner

*Primary Examiner* — Hanh Phan
(74) *Attorney, Agent, or Firm* — WORKMAN NYDEGGER

(57) ABSTRACT

A detection unit detecting adjustment patterns formed by a discharging head discharging color ink on a medium is provided, in which the detection unit includes a light emitting unit irradiating the medium with visible light, a light receiving unit receiving reflected light of the visible light, and at least one filter disposed on an optical path from the light emitting unit to the light receiving unit, and configured to attenuate an amount of light, and the filter, when a first absorption bandwidth is a wavelength range centered at a peak wavelength of an absorption wavelength in an absorption spectrum of a color of ink used to form the adjustment patterns and a first emission bandwidth is a wavelength range, corresponding to the first absorption bandwidth, of an emission spectrum of the visible light, is attenuated the visible light having a wavelength in an outside range of the first emission bandwidth.

7 Claims, 5 Drawing Sheets

RECORDING APPARATUS

The present application is based on, and claims priority from JP Application Serial Number 2020-030183, filed Feb. 26, 2020, the disclosure of which is hereby incorporated by reference herein in its entirety.

BACKGROUND

1. Technical Field

The present disclosure relates to a recording apparatus including a detection unit configured to detect an optical density of an adjustment pattern.

2. Related Art

In the related art, there is known a recording apparatus configured to perform recording with shifting a discharge timing of ink with respect to a plurality of reference patterns to record an adjustment pattern (JP 2015-178202 A). A means for reading such an adjustment pattern includes a so-called reflective sensor configured to irradiate the adjustment pattern with light from a light emitting unit such as an LED and to detect the light reflected from the adjustment pattern without being absorbed by the adjustment pattern.

In general, an emission spectrum of the LED has peaks within a plurality of bandwidths (WO 2009/028656 A1).

Some detection units that detect the optical density of the adjustment pattern printed with color ink are configured to irradiate visible light and to receive reflected light of the visible light to perform the detection. The visible light is light having a wavelength range from 380 nm to 780 nm. Because the color ink used for the adjustment pattern is yellow, magenta, cyan, and the like, a color of the adjustment pattern mainly absorbs wavelengths in a part of the wavelength range from 380 nm to 780 nm of the visible light. That is, many unabsorbed wavelength ranges remain within the entire wavelength range of the visible light.

The many unabsorbed wavelength ranges that remain may lead to a reduction in sensitivity of the detection unit.

In JP 2015-178202 A and WO 2009/028656 A1, there is no description considering, nor no suggestion about an issue of the reduction in sensitivity of the detection unit based on the many unabsorbed wavelength ranges that remain.

SUMMARY

In order to resolve the above-described issue, a recording apparatus according to the present disclosure includes a discharging head configured to discharge at least one type of color ink onto a medium, and a detection unit configured to detect an optical density of a plurality of adjustment patterns formed by the discharging head on the medium, in which the detection unit includes a light emitting unit configured to irradiate the medium with visible light, a light receiving unit configured to receive reflected light from the medium, and at least one filter disposed on an optical path on which the visible light emitted from the light emitting unit is reflected by the medium to be incident on the light receiving unit, and configured to attenuate an amount of light, and the at least one filter, when a first absorption bandwidth is a wavelength range centered at a peak wavelength of an absorption wavelength in an absorption spectrum of a color of ink used to form the adjustment pattern and a first emission bandwidth is a wavelength range, corresponding to the first absorption bandwidth, of an emission spectrum of the visible light, is configured to attenuate the visible light having a wavelength outside the first emission bandwidth.

DESCRIPTION OF EXEMPLARY EMBODIMENTS

Figure 1:
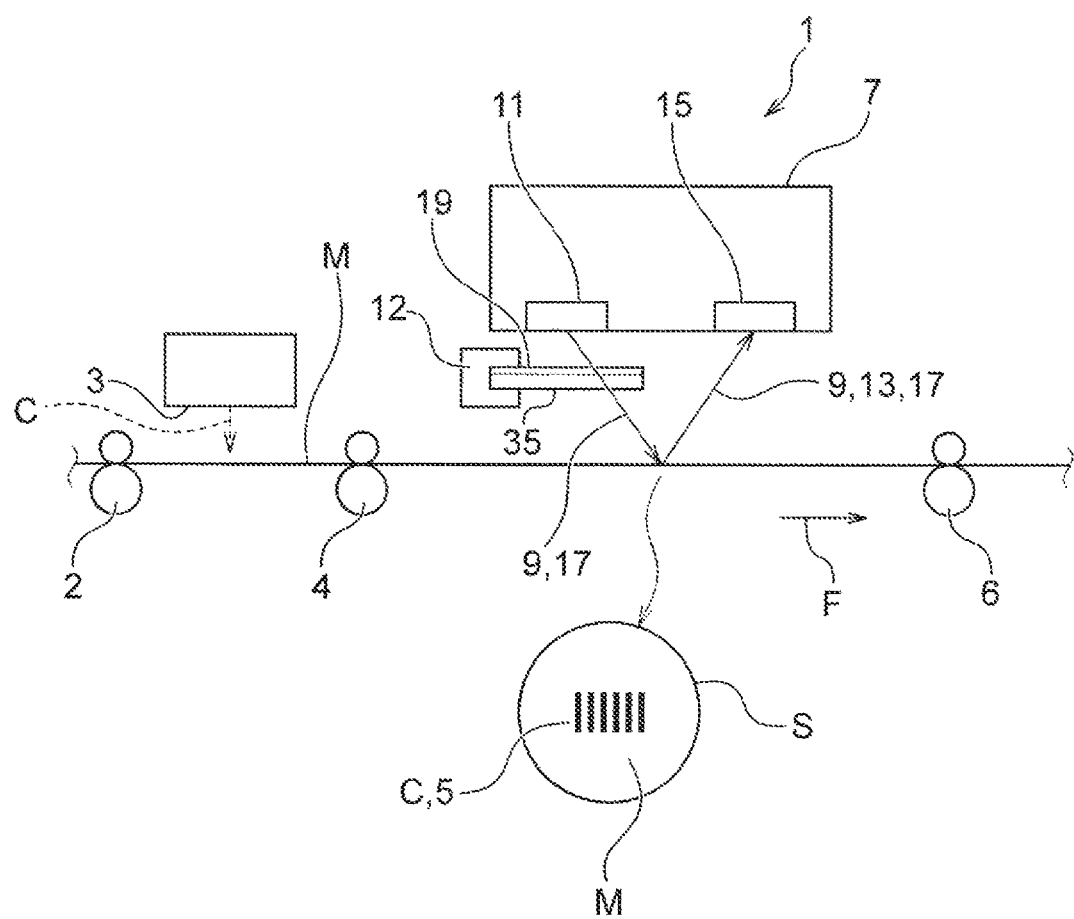
FIG. 1 is an overview schematically illustrating a main part of a recording apparatus according to Embodiment 1 of the present disclosure.

First, the present disclosure will be schematically described below.

A recording apparatus of a first aspect according to the present disclosure for resolving the above-described issue includes a discharging head configured to discharge at least one type of color ink onto a medium, and a detection unit configured to detect an optical density of a plurality of adjustment patterns formed by the discharging head on the medium, in which the detection unit includes a light emitting unit configured to irradiate the medium with visible light, a light receiving unit configured to receive reflected light from the medium, and at least one filter disposed on an optical path on which the visible light emitted from the light emitting unit is reflected by the medium to be incident on the light receiving unit, and configured to attenuate an amount of light, and the at least one filter, when a first absorption bandwidth is a wavelength range centered at a peak wavelength of an absorption wavelength in an absorption spectrum of a color of ink used to form the adjustment pattern and a first emission bandwidth is a wavelength range, corresponding to the first absorption bandwidth, of an emission spectrum of the visible light, is configured to attenuate the visible light having a wavelength outside the first emission bandwidth.

Here, the "a wavelength range centered at a peak wavelength of an absorption wavelength in an absorption spectrum of a color of ink" is set so as to substantially obtain an effect of the above-described attenuation, and is set in accord with shapes such as positions, the number, magnitudes (heights), and the like of peaks of the emission spectrum of the visible light that is used.

In addition, the term "corresponding to" in the "a first emission bandwidth is a wavelength range, corresponding to the first absorption bandwidth, of an emission spectrum of the visible light" does not require that a range of the first absorption bandwidth definitely correspondingly coincides with a range of the first emission bandwidth. The filter may cause the range of the first absorption bandwidth to shift from the range of the first emission bandwidth in a range of substantially obtaining an effect of attenuating the visible light having a wavelength in an outside range of the first emission bandwidth.

Further, the term "to attenuate" refers to a reduction, after the visible light passed through the filter, in energy (vibrational amplitude) of the visible light and an area of continuous spectra, compared to before the visible light passes through the filter.

According to the above aspect, the detection unit includes at least one filter disposed on an optical path on which the visible light emitted from the light emitting unit is reflected by the medium to become reflected light and to be incident on the light receiving unit, and configured to attenuate an amount of light. Moreover, the at least one filter, when a first absorption bandwidth is a wavelength range centered at a peak wavelength of an absorption wavelength in an absorption spectrum of a color of ink used to form the adjustment pattern and a first emission bandwidth is a wavelength range, corresponding to the first absorption bandwidth, of an emission spectrum of the visible light, is configured to attenuate the visible light having a wavelength in an outside range of the first emission bandwidth.

This allows, even if a large amount of light in a wavelength range that is not absorbed by the color of the ink used to form the adjustment pattern remains in the reflected light, the filter to attenuate the visible light, and the visible light is incident on the light receiving unit. This makes it possible to decrease a reduction in sensitivity of the detection unit.

A recording apparatus according to a second aspect of the present disclosure is the recording apparatus according to the first aspect, in which the at least one filter includes a plurality of filters that attenuate mutually different wavelength ranges, where the plurality of filters are switchable corresponding to the color of the ink used to form the adjustment pattern.

According to the above aspect, the at least one filter includes the plurality of filters that attenuate mutually different wavelength ranges, where the plurality of filters are switchable corresponding to the color of the ink used to form the adjustment pattern. This makes it possible to perform the attenuation using a suitable filter corresponding to the color of the ink used to form the adjustment pattern, thus enabling to effectively decrease a reduction in sensitivity of the detection unit.

This also makes it possible to switch the plurality of filters in accordance with a usage environment of a user.

A recording apparatus according to a third aspect of the present disclosure is the recording apparatus according to the first aspect or the second aspect, in which the filter is configured, when yellow is selected as the ink used to form the adjustment pattern, to attenuate wavelengths in a range from 500 nm to 780 nm.

According to the above aspect, the filter is configured, when yellow is selected as the ink used to form the adjustment pattern, to attenuate wavelengths in the range from 500 nm to 780 nm, thus enabling to effectively decrease a reduction in sensitivity of the detection unit.

A recording apparatus according to a fourth aspect of the present disclosure is the recording apparatus according to any one of the first to third aspects, in which the at least one filter includes the plurality of filters having mutually different attenuation rates that are switchable.

For example, changing the attenuation rate enables to enhance the sensitivity when the shape of the adjustment pattern changes to cause the attenuation rate of the filter to become too high or too low and resulting in a state where a sensitivity of the detection unit is reduced.

According to the above aspect, the at least one filter includes the plurality of filters having mutually different attenuation rates that are switchable. This makes it possible to change the attenuation rate, thus enabling to effectively decrease a reduction in sensitivity of the detection unit.

A recording apparatus according to a fifth aspect of the present disclosure is the recording apparatus according to the fourth aspect, in which the plurality of filters that mutually differ in the attenuation rate are each disposed at a rotation member that is rotatable, where the rotation member is configured to rotate to switch the attenuation rate.

According to the above aspect, the plurality of filters that mutually differ in the attenuation rate are each disposed at the rotation member that is rotatable, where the rotation member is rotated to switch the attenuation rate. This makes it possible to easily change the attenuation rate of the filter by a simple structure like the rotating of the rotation member.

A recording apparatus according to a sixth aspect of the present disclosure is the recording apparatus according to any one of the first to fifth aspects, in which a transmission member that transmits visible light is disposed on the optical path, and the filter is provided on a side, opposite to a side on which the medium is supported, of the transmission member.

For example, the medium, when wrinkling or floating occurs, may be in contact with the filter to damage the filter. According to the above aspect, it is possible to suppress the transmission member from damaging the filter.

A recording apparatus according to a seventh aspect of the present disclosure is the recording apparatus according to any one of the first to sixth aspects, in which an intensity of the visible light emitted from the light emitting unit is variable.

For example, changing the intensity of the visible light emitted from the light emitting unit enables to enhance the sensitivity when the color of the ink used to form the adjustment pattern is changed from yellow to magenta to cause the attenuation rate of the filter to become too high or too low and resulting in a state where a sensitivity of the detection unit is reduced.

According to the above aspect, the intensity of visible light emitted from the light emitting unit is variable, thus enabling to effectively decrease a reduction in sensitivity of the detection unit.

Embodiment 1

Hereinafter, a recording apparatus of Embodiment 1 according to the present disclosure will be described in detail with reference to FIGS. 1 and 2.

FIG. 1 illustrates an inkjet printer as an example of a recording apparatus 1. The recording apparatus 1 is configured to discharge color ink onto the medium M to record various types of information.

The medium M is formed of various materials such as paper (roll paper, single sheet paper), textile (fabric, cloth, and the like).

As illustrated in FIG. 1, in Embodiment 1, the recording apparatus 1 includes a discharging head 3 configured to discharge at least one type of color ink C onto the medium M, and a detection unit 7 configured to detect an optical density of a plurality of adjustment patterns 5 formed by the discharging head 3 on the medium M. FIG. 1 is accompanied by an illustration of a plan view S enlarging a part of the medium M where ink is discharged to record the adjustment pattern 5.

The detection unit 7 includes a light emitting unit 11 configured to irradiate the medium M with visible light 9, a light receiving unit 15 configured to receive reflected light 13 from the medium M, and at least one filter 19 disposed on an optical path 17 on which the visible light 9 emitted from the light emitting unit 11 is reflected by the medium M to be incident on the light receiving unit 15, and configured to attenuate an amount of light. The recording apparatus 1 includes transport rollers 2, 4, and 6 for transporting the medium M in a transport direction F. Each of the components will be described in detail below.

Discharging Head

The discharging head 3 includes a plurality of nozzle rows (not illustrated) configured to discharge the color ink C.

In Embodiment 1, color types of the color ink are three types, that are, cyan, magenta, and yellow. Note that the color types of the color ink are not limited to the three types, and may be four or more types including any one type, any two types, light magenta, and the like.

The discharging head 3 also includes a nozzle row configured to discharge black ink.

The discharging head 3 discharges ink, receiving a control signal from a control unit (not illustrated), onto the medium M while reciprocally moving in a width direction intersecting the transport direction F in which the medium M is transported, to record image information. In Embodiment 1, the discharging head 3 is configured to perform both of a one-way recording in which the ink is discharged during a movement in one direction of the reciprocal movement and a reciprocal recording in which the ink is discharged during movements in both a forward direction and a backward direction of the reciprocal movement.

The discharging head 3 is configured to record, receiving the control signal from the control unit, the adjustment pattern 5 on the medium in order to adjust a discharge timing of the ink, in addition to the recording of the image information.

The adjustment pattern 5 refers to a pattern having a constant grayscale formed by discharging of the ink from the discharging head 3. The adjustment pattern 5 is typically a plurality of line segments having a constant width and a constant length that are illustrated in FIG. 1, which are formed adjacent to each other at regular intervals in the width direction, for example. The adjustment pattern 5 includes a pattern recorded in the one-way recording and a superimposed pattern superimposedly formed in the reciprocal recording.

Detection Unit

The detection unit 7 is configure to detect the optical density of the plurality of adjustment patterns 5 formed by the discharging head 3 on the medium M. In Embodiment 1, the detection unit 7 is configured using a white LED and an infrared phototransistor.

Figure 2:
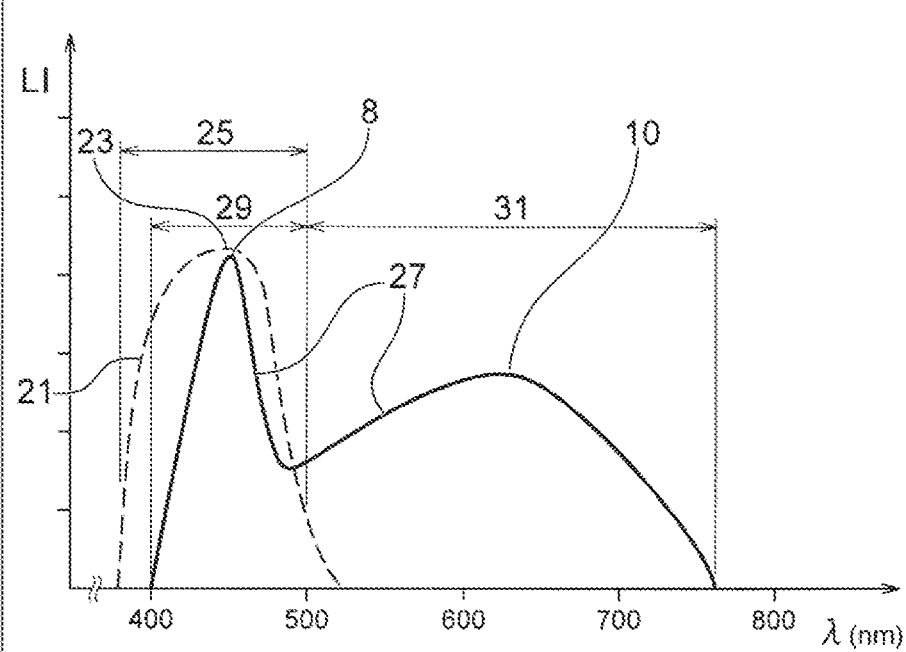
FIG. 2 is a graph of an emission spectrum of visible light emitted from a detection unit and an absorption spectrum of yellow ink, where a figure (A) upside illustrates a state where a filter is not present and a figure (B) downside illustrates a state where the filter is present.
Figure 2:
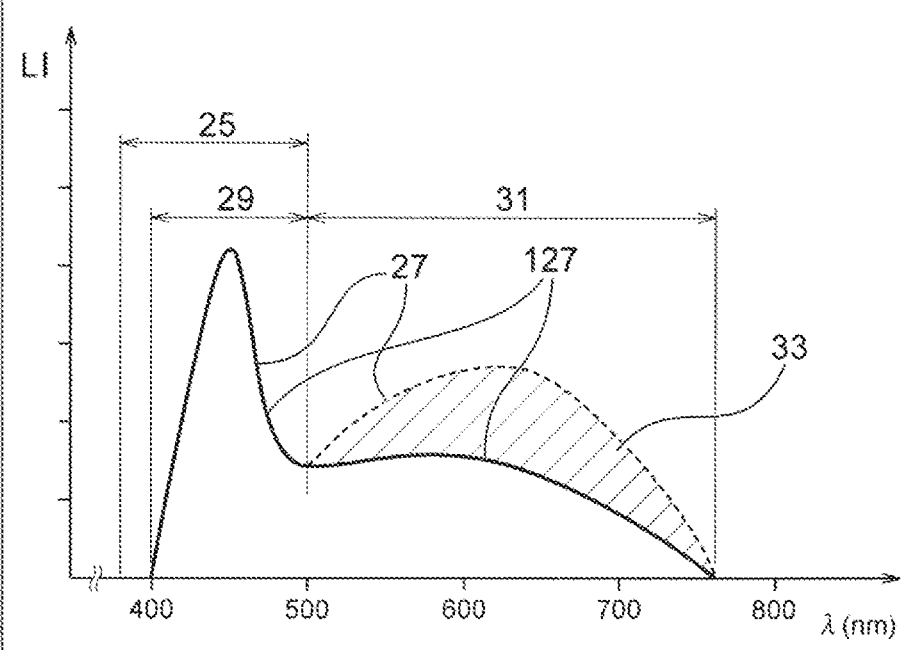

In a figure (A) upside of FIG. 2, the reference sign of 27 denotes an emission spectrum of the visible light 9 emitted from the light emitting unit 11 of the detection unit 7. Further, the reference sign of 21 denotes an absorption spectrum of yellow ink. The horizontal axis represents a wavelength λ (unit: nm) and the vertical axis represents an intensity LI of the spectrum.

The visible light 9 is light having the wavelength range from 380 nm to 780 nm. When color ink used for the adjustment pattern 5 is yellow, yellow in the adjustment pattern 5 absorbs light having a wavelength in a range from 380 nm to 500 nm, but does not absorb light having wavelengths in the other ranges, as understood from the figure. That is, the yellow in the adjustment pattern 5 absorbs light having wavelengths in a part of the wavelength range from 380 nm to 780 nm of the visible light.

In other words, within the entire wavelength range of the visible light, many wavelength ranges from 500 nm to 780 nm that are not absorbed by the yellow in the adjustment pattern 5 remain, and the remaining visible light having the wavelength ranges from 500 nm to 780 nm is reflected from a surface of the medium M.

Filter

In Embodiment 1, the filter 19 is disposed on the optical path 17 between the light emitting unit 11 and the medium M.

The filter 19 is configured to absorb a part of a wavelength range of an emission spectrum 27 of the visible light 9 in a manner attenuating the part of the wavelength range. Here, the term "attenuating" refers to a reduction, after the visible light 9 passed through the filter 19, in energy (vibrational amplitude) of the visible light 9 and an area of continuous spectra, compared to before the visible light 9 passes through the filter 19.

As illustrated in FIG. 2, the filter 19, when a first absorption bandwidth 25 is a wavelength range centered at a peak wavelength 23 of an absorption wavelength in an absorption spectrum 21 of yellow ink used to form the adjustment pattern 5 and a first emission bandwidth 29 is a wavelength range, corresponding to the first absorption bandwidth 25, of the emission spectrum 27 of the visible light 9, is configured to attenuate visible light having a wavelength from 500 nm to 780 nm that is a wavelength in an outside range 31 of the first emission bandwidth 29.

Here, the wavelength range centered at the peak wavelength 23 of the absorption wavelength in the absorption spectrum 21, that is, the first absorption bandwidth 25, is set so as to substantially obtain an effect of suppressing a reduction in sensitivity by the above-described attenuation. Specifically, the first absorption bandwidth 25 is set based on a shape of the absorption spectrum 21 and a shape of the emission spectrum 27 of the visible light 9 that is used, that are, positions, the number, magnitudes (heights), and the like of peaks 8 and 10, which are not properties that are stereotypically determined.

In addition, the term "corresponding to" in the "a first emission bandwidth 29 is a wavelength range, corresponding to the first absorption bandwidth 25, of the emission spectrum 27 of the visible light 9" does not require that the range of the first absorption bandwidth definitely correspondingly coincides with the range of the first emission bandwidth. The filter 19 may cause the range of the first emission bandwidth 29 to shift from the range of the first emission bandwidth 29 in a range of substantially obtaining an effect of suppressing the above-described reduction in sensitivity by attenuating the visible light having the wavelength in the outside range 31 of the first emission bandwidth 29.

The figure (A) upside of FIG. 2 illustrates a state where the filter 19 is not present, and a figure (B) downside illustrates a state where the filter 19 is present.

The figure (B) downside of FIG. 2 illustrates a state where the emission spectrum 27 having a wavelength in a range from 500 nm to 780 nm is attenuated by the filter 19 to be changed to another shape of the emission spectrum 127. A hatched region 33 in the figure (B) corresponds to an amount of an attenuation by the filter 19.

The amount of the attenuation by the filter 19, or the attenuation rate, is larger the better in suppressing the reduction in sensitivity, and is specifically set so as to substantially obtain the effect of suppressing the above-described reduction in sensitivity by the above-described attenuation.

Filter and Transmission Member

In Embodiment 1, a transmission member 35 configured to transmit the visible light 9 is disposed on the optical path 17. The filter 19 is provided on a side opposite to a side of the transmission member 35 on which the medium M is supported, and is configured as an integral body of a plate-like shape in its entirety. The integral body of the filter 19 and the transmission member 35 is held at its one end by a filter holding section 12. The filter holding section 12 is attached to the detection unit 7.

Switching of Filter

In Embodiment 1, the at least one filter 19 includes a plurality of filter 191 (the first filter), filter 192 (the second filter), . . . , and filter 19n (the n-th filter) that attenuate mutually different wavelength ranges, where n is an integer not less than 2. These plurality of filters 191, 192, . . . , and 19n are configured to perform a proper attenuation corresponding to the colors of the ink used to form the adjustment pattern 5, that are, colors of yellow, magenta, cyan, and the like. For example, when the adjustment pattern 5 is formed of respective colors of black, yellow, magenta, and cyan, the at least one filter 19 includes the plurality of filters 191, 192, 193, and 194. Further, these plurality of filters 191, 192, . . . , and 19n are configured to be switchable. Note that in FIG. 1, only the reference sign of 19 is denoted, and illustrations of the reference signs of 191, 192, . . . , and 19n are omitted in view of avoiding complications in the figure.

Specifically, each of the integral bodies of the filters 191, 192, . . . , and 19n and the transmission member 35 are detachably held by the filter holding section 12. Then, when the color of the ink used to form the adjustment pattern 5 is magenta, the filter is switched to the filter 19 for magenta, and when cyan, the filter is switched to the filter 19 for cyan.

When Ink Used for Adjustment Pattern is Magenta or Cyan

Figure 3:
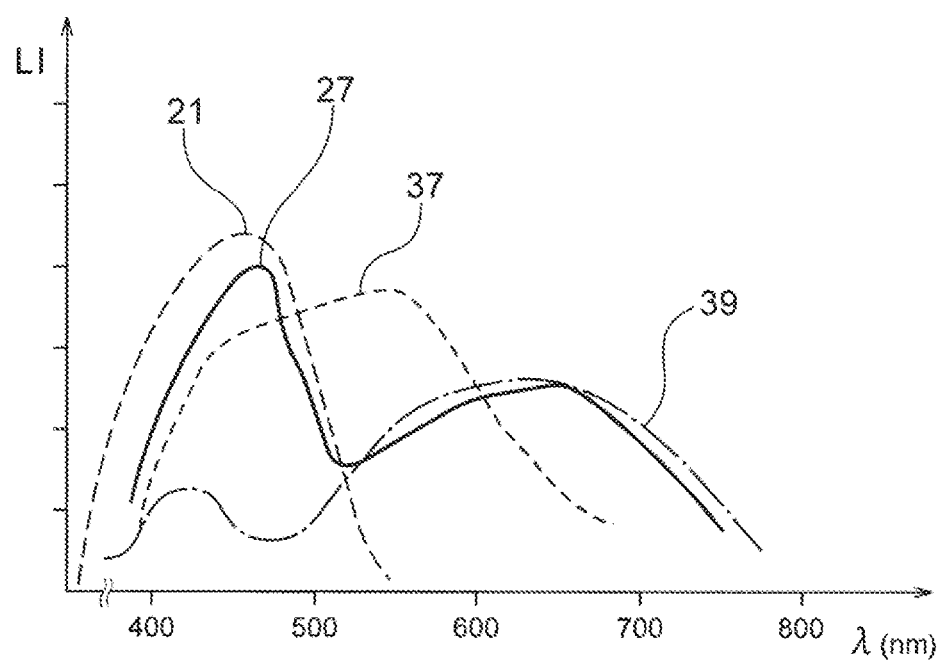
FIG. 3 is a graph of an emission spectrum of visible light and respective absorption spectra of ink of yellow, magenta, and cyan.

FIG. 3 is a graph of the emission spectrum 27 of the visible light 9 and respective absorption spectra of ink of yellow, magenta, and cyan. The reference sign of 37 denotes an absorption spectrum of magenta ink, and the reference sign of 39 denotes an absorption spectrum of cyan ink.

As understood from FIG. 3, an absorption spectrum 37 of magenta and an absorption spectrum 39 of cyan differs from the absorption spectrum 21 of yellow in peak wavelength and absorption wavelength range, and further in magnitude.

When the color ink used for the adjustment pattern 5 is magenta or cyan, a range of the first absorption bandwidth 25 and a range of a corresponding first emission bandwidth 29 each vary. That is, the ranges vary to a range corresponding to the filter 19 for magenta or the filter 19 for cyan.

These specific ranges are determined as in the case of yellow. That is, these specific ranges are set beforehand so as to effectively obtain the effect of the above-described attenuation. That is, the range of the first absorption bandwidth 25 is determined, and the range of the first emission bandwidth 29 is determined based on the range of the first absorption bandwidth 25.

Similarly, a position of the outside range 31 of the corresponding first emission bandwidth 29 is also determined corresponding to the filter 19 for magenta or the filter 19 for cyan.

Note that the shapes of the respective absorption spectra 21, 37, and 39 illustrated in FIG. 3 is an example. The respective absorption spectra 21, 37, and 39 are not singly determined depending on all types of yellow ink, magenta ink, and cyan ink. For example, even when belonging to the same type of yellow, the shapes of the absorption spectra change depending on the difference in the constituent of yellow. Thus, the range of the first absorption bandwidth 25 and the range of the corresponding first emission bandwidth 29 vary accordingly as well.

The shape of the emission spectrum 27 of the visible light 9 is also an example. The shape of the emission spectrum 27 also changes depending on a variation of types of the LED. The range of the first absorption bandwidth 25 and the range of the corresponding first emission bandwidth 29 each vary as well.

Other Examples of Disposition of Filter

Figure 4:
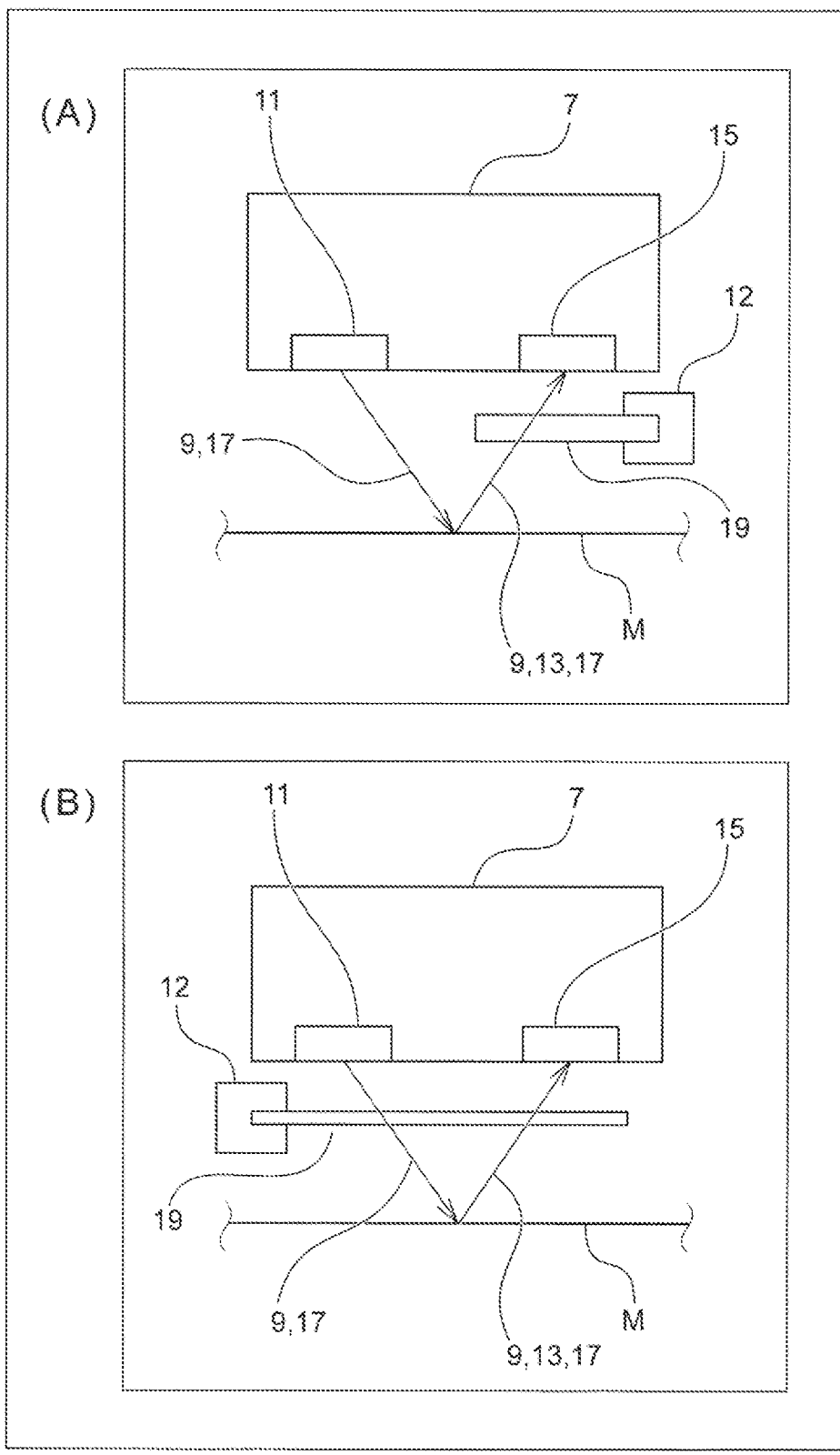
FIG. 4 is a view schematically illustrating other two examples (A) and (B) of a filter disposition of a detection unit according to Embodiment 1.

FIG. 4 illustrates another example of the disposition of the filter 19. In FIG. 1, the filter 19 is disposed, but not limited to, on the optical path 17 between the light emitting unit 11 and the medium M.

As illustrated in a figure (A) upside of FIG. 4, the filter 19 may be disposed on the optical path 17 between the medium M and the light receiving unit 15, that is, on the optical path 17 of the reflected light 13.

Alternatively, as illustrated in a figure (B) downside of FIG. 4, the filter 19 may be disposed on the optical path 17 between the light emitting unit 11 and the medium M, and further across this and between the medium M and the light receiving unit 15. In this disposition, because the visible light 9 passes through the filter 19 twice, it is possible to make the filter 19 thinner in thickness than the filter 19 in other structures in which the visible light 9 passes through the filter 19 once, for example.

Description on Operations and Advantageous Effects of Embodiment 1

Operations and advantageous effects of the recording apparatus 1 of Embodiment 1 will be described with reference to FIGS. 1 to 4.

The discharging head 3 records the adjustment pattern 5 on the medium M. When the medium M is transported by the transport rollers 2, 4, and 6 and the adjustment pattern 5 reaches a detection position at which the detection unit 7 detects, the visible light 9 is emitted from the light emitting unit 11 of the detection unit 7 to a location where the adjustment pattern 5 is present. The visible light 9 is reflected by the medium M at the location where the adjustment pattern 5 is present, and the reflected light 13 is incident on the light receiving unit. This allows the detection unit 7 to detect an optical density of the adjustment pattern 5.

(1) According to Embodiment 1, the detection unit 7 includes the at least one filter 19 disposed on the optical path 17 on which the visible light 9 emitted from the light emitting unit 11 is reflected by the medium M to become the reflected light 13 and to be incident on the light receiving unit 15, and configured to attenuate an amount of light. Moreover, the filter 19, when the first absorption bandwidth 25 is a wavelength range centered at the peak wavelength 23 of an absorption wavelength in the absorption spectrum 21 of the color (yellow) of the ink used to form the adjustment pattern 5 and the first emission bandwidth 29 is a wavelength range, corresponding to the first absorption bandwidth 25, of the emission spectrum 27 of the visible light 9, is configured to attenuate the visible light 9 having the wavelength in the outside range 31 of the first emission bandwidth 29.

This allows, even if a large amount of light in a wavelength range that is not absorbed by the color of the ink used to form the adjustment pattern 5 remains in the reflected light 13, the filter 19 to attenuate the visible light 9, and the visible light 9 is incident on the light receiving unit 15. This makes it possible to decrease a reduction in sensitivity of the detection unit 7.

(2) Further, according to Embodiment 1, the at least one filter 19 includes the plurality of filters 19, 19, . . . that attenuate mutually different wavelength ranges, and the plurality of filters 19, 19, . . . are switchable corresponding to the color of the ink used to form the adjustment pattern 5. This makes it possible to perform the above-described attenuation using suitable filters 19, 19, . . . corresponding to the color of the ink used to form the adjustment pattern 5, thus enabling to effectively decrease the reduction in sensitivity of the detection unit 7.

This also makes it possible to switch the plurality of filters 19, 19, . . . in accordance with a usage environment of the user.

(3) Further, according to Embodiment 1, the filter 19 is configured, when yellow is selected as the ink used to form the adjustment pattern 5, to attenuate wavelengths in the range from 500 nm to 780 nm, thus enabling to effectively decrease the reduction in sensitivity of the detection unit 7.

(4) For example, the medium M, when wrinkling or floating occurs, may be in contact with the filter 19 to damage the filter 19. According to Embodiment 1, it is possible to suppress the transmission member 35 from damaging the filter 19.

Embodiment 2

Hereinafter, a recording apparatus of Embodiment 2 according to the present disclosure will be described with reference to FIG. 5.

Note that components that are common with Embodiment 1 are referenced using like numbers, and no descriptions for such components are provided. Also, no descriptions for the operations and advantageous effects as in Embodiment 1 are provided as well.

Filters Having Different Attenuation Rates

In Embodiment 2, the filter 19 is configured to switch a plurality of filters 19a, 19b, 19c, . . . having mutually different attenuation rates.

Figure 5:
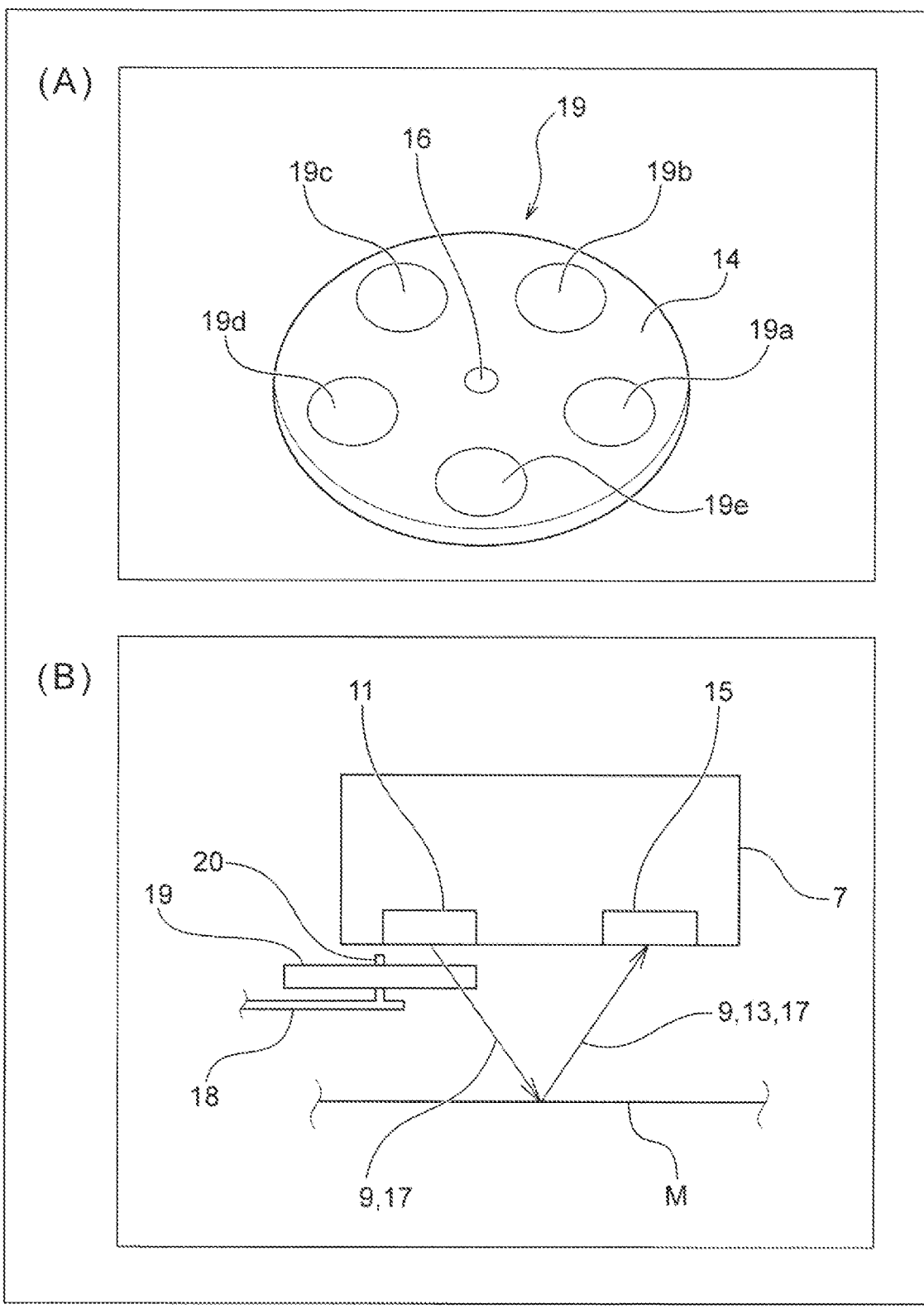
FIG. 5 is an overview schematically illustrating a main part of a recording apparatus according to Embodiment 2.

Specifically, as illustrated in a figure (A) upside of FIG. 5, the filter 19 includes five sheets of the filters 19a, 19b, . . . , and 19e having mutually different attenuation rates that are provided at a rotation member 14 of a circular shape configured to rotate around a center. Note that the filters are not limited to the five sheets of the filters 19a, 19b, . . . , and 19e. The reference sign of 16 denotes a through hole located in the center of the rotation member 14.

In Embodiment 2, the attenuation rates of the filter 19 differ by 20% at five stages, like 20%, 40%, . . . , and 100%. It goes without saying that the attenuation rates are not limited to the above-described structure of five stages.

In Embodiment 2, as illustrated in a figure (B) downside of FIG. 5, the plurality of filters 19a, 19b, . . . , and 19e that mutually differ in the above-described attenuation rate are arranged at the rotation member 14 that is rotatable, where the rotation member 14 is configured to rotate around the center to switch the attenuation rate. The rotation member 14 is configured to rotate around the center when a shaft 20 of the filter holding section 18 is inserted into a through hole 16 of the rotation member 14.

Note that Embodiment 2 may be combined with the Embodiment 1. Specifically, the attenuation rates of the plurality of filter 191 (the first filter), filter 192 (the second filter), . . . , and filter 19n (the n-th filter) that attenuate mutually different wavelength ranges may be varied from each other. This allows both the wavelength range to be attenuated and the attenuation rate of this attenuation to be optimized corresponding to the color of the ink among a plurality of ink that are used when forming the adjustment pattern 5, and allows a detection accuracy of the adjustment pattern 5 to further be improved.

Description on Operations and Advantageous Effects of Embodiment 2

Next, advantageous effects of the recording apparatus 1 of Embodiment 2 will be described with reference to FIG. 5.

(1) For example, changing the above-described attenuation rate enables to enhance the above-described sensitivity when the shape of the adjustment pattern 5 changes to cause the above-described attenuation rate of the filter 19 to become too high or too low and resulting in a state where the sensitivity of the detection unit 7 is reduced.

According to Embodiment 2, the at least one filter 19 includes the plurality of filters 19a, 19b, . . . , and 19e having mutually different attenuation rates that are switchable. This makes it possible to change the above-described attenuation rate, thus enabling to effectively decrease the reduction in sensitivity of the detection unit 7.

Also, according to Embodiment 2, the plurality of filters 19a, 19b, . . . , and 19e that mutually differ in the above-described attenuation rate are each disposed at the rotation member 14 that is rotatable, where the rotation member 14 is configured to rotate to switch the attenuation rate. This makes it possible to easily change the attenuation rate of the filter 19 by a simple structure like the rotating of the rotation member 14.

Embodiment 3

Hereinafter, a recording apparatus of Embodiment 3 according to the present disclosure will be described.

Note that no descriptions for components that are common with the Embodiment 1 or Embodiment 2 are provided. Also, no descriptions for the operations and advantageous effects as in Embodiment 1 are provided as well.

In Embodiment 3, an intensity of the visible light 9 emitted from the light emitting unit 11 of the detection unit 7 is variable.

For example, when bandwidths other than medium wavelengths from 380 nm to 500 nm and from 600 nm to 780 nm (supposing that the visible light is in a range from 380 nm to 780 nm) are cut in order to make magenta easily viewable, a color other than magenta such as yellow may become hardly viewable depending on the attenuation rate, that is, the color other may become hard to be detected. In this case, the color other than magenta can be made easily detectable by enhancing the intensity of the visible light 9 emitted from the light emitting unit 11 without changing the attenuation rate of the filter 19.

Note that Embodiment 3 may be combined with at least one of Embodiment 1 or Embodiment 2. Specifically, the intensity of the visible light 9 from the light emitting unit 11 passing through the plurality of filter 191 (the first filter), filter 192 (the second filter), . . . , and filter 19n (the n-th filter) that attenuate mutually different wavelength ranges may be varied. Alternatively, the intensity of the visible light 9 from the light emitting unit 11 passing through the five sheets of the filters 19a, 19b, . . . , and 19e having mutually different attenuation rates may be varied. Alternatively, these two aspects may be combined. This optimizes at least one of the wavelength range to be attenuated or the attenuation rate of this attenuation, thus enabling to suppress unnecessarily enhancing the intensity of the visible light 9 emitted from the light emitting unit 11, suppressing power consumption of the light emitting unit 11 and shortening of the lifetime of the light emitting unit 11.

Other Embodiments

The recording apparatus 1 according to Embodiments of the present disclosure is based on the configurations described above. However, as a matter of course, modifications, omission, and the like may be made to a partial configuration without departing from the gist of the disclosure of the present application.

In correspondence with the color of the ink, the structure of switching the plurality of filters 191, 192, . . . , and 19n may be a switching by rotation of the rotation member illustrated in FIG. 5. The rotation member illustrated in FIG. 5 may be rotated by the user. Alternatively, a control unit or the like included in the recording apparatus 1 may be configured to recognize the color of the ink used when forming the adjustment pattern 5, where the control unit may be configured to send a command signal to a drive mechanism such as a motor, to thus automatically rotate the rotation member.

What is claimed is:

1. A recording apparatus, comprising:
a discharging head configured to discharge at least one type of color ink onto a medium; and
a detection unit configured to detect an optical density of a plurality of adjustment patterns formed by the discharging head on the medium; wherein
the detection unit includes
a light emitting unit configured to irradiate the medium with visible light,
a light receiving unit configured to receive reflected light from the medium, and
at least one filter disposed on an optical path on which the visible light emitted from the light emitting unit is reflected by the medium to be incident on the light receiving unit, and configured to attenuate an amount of the light, and
when a first absorption bandwidth is a wavelength range centered at a peak wavelength of an absorption wavelength of an absorption spectrum of a color of ink used to form the adjustment pattern and a first emission bandwidth is a wavelength range, corresponding to the first absorption bandwidth, of an emission spectrum of the visible light,
the at least one filter is configured to attenuate the visible light having a wavelength outside the first emission bandwidth.

2. The recording apparatus according to claim 1, wherein
the at least one filter includes a plurality of filters that attenuate mutually different wavelength ranges, and the plurality of filters are switchable corresponding to the color of the ink used to form the adjustment pattern.

3. The recording apparatus according to claim 1, wherein
the at least one filter is configured to attenuate wavelengths in a range from 500 nm to 780 nm when yellow is selected as the ink used to form the adjustment pattern.

4. The recording apparatus according to claim 1, wherein
the at least one filter includes the plurality of filters that have mutually different attenuation rates and are switchable.

5. The recording apparatus according to claim 4, wherein
the plurality of filters that have mutually different attenuation rates are each disposed at a rotation member that is rotatable, and the rotation member is configured to rotate to switch the attenuation rate.

6. The recording apparatus according to claim 1, wherein
a transmission member that transmits visible light is disposed on the optical path, and
the at least one filter is provided on a side, opposite to a side on which the medium is supported, of the transmission member.

7. The recording apparatus according to claim 1, wherein
an intensity of the visible light emitted from the light emitting unit is variable.

* * * * *